(12) United States Patent
Bolot et al.

(10) Patent No.: US 8,391,836 B1
(45) Date of Patent: Mar. 5, 2013

(54) CALL DETAIL RECORD ANALYSIS TO ISOLATE AND UTILIZE SUBSCRIBER DATA

(75) Inventors: Jean Bolot, Mountain View, CA (US); Hui Zang, Cupertino, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 151 days.

(21) Appl. No.: 13/076,501

(22) Filed: Mar. 31, 2011

(51) Int. Cl.
*H04M 11/00* (2006.01)
*G06Q 30/00* (2012.01)

(52) U.S. Cl. .................. 455/408; 705/14.49; 705/14.52; 705/14.63

(58) Field of Classification Search .................. 455/408; 705/14.49, 14.52, 14.63
See application file for complete search history.

(56) References Cited

U.S. PATENT DOCUMENTS

| | | | |
|---|---|---|---|
| 2006/0293025 A1* | 12/2006 | Chiou et al. | 455/405 |
| 2009/0198579 A1* | 8/2009 | Lewis et al. | 705/14 |
| 2012/0064860 A1* | 3/2012 | O'Neil et al. | 455/408 |

\* cited by examiner

*Primary Examiner* — Creighton Smith

(57) ABSTRACT

A system for analyzing call detail records to derive demographic data is provided. The system comprises a processor, a memory, and an application stored in the memory. When executed by the processor, the application analyzes call detail records associated with a base transceiver station to determine statistical information about the subscriber calls within the coverage area and to estimate demographics of people within the coverage area.

8 Claims, 5 Drawing Sheets

CALL DETAIL RECORD ANALYSIS TO ISOLATE AND UTILIZE SUBSCRIBER DATA

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile communication is the provision of voice, data, and other wireless services to portable electronic devices that may move about freely rather than stay fixed in a single location. Mobile telephones connect wirelessly to land-based cellular networks of base transceiver stations that link to a public switched telephone network to allow any telephone in the world to be dialed. Mobile telephones send and receive radio signals with any number of cell site base transceiver stations fitted with microwave antennas. These sites are usually mounted on a tower, pole or building, located throughout populated areas, then connected to a cabled communication network and switching system. The mobile telephones have low-power transceivers that transmit voice and data to the nearest cell sites. The mobile telephone has transitioned from being an expensive item used by the business elite to a pervasive, personal communications tool for the general population. In most countries, mobile telephones outnumber landline phones and have become important components of the society's contemporary culture. The use of mobile phones by people who are driving has become increasingly common, either as part of their occupation or for talking with family or friends.

SUMMARY

In an embodiment, a system for analyzing call detail records to derive demographic data is disclosed. The system comprises a processor, a memory, and an application stored in the memory. When executed by the processor the application accesses a first plurality of stored call detail records (CDR), selects a first plurality of call detail records from a data store associated with voice calls transmitted via a base transceiver station, selects a second plurality of call detail records from the first plurality of call detail records wherein the second plurality of call detail records were created during a predetermined time period, and accesses subscriber records associated with the second plurality of call detail records. The application further determines from demographic information in the subscriber records that a predetermined percentage of subscribers associated with the subscriber records exhibit a demographic characteristic. The application further compiles statistical information linking subscribers associated with the demographic characteristic to potential benefit associated with access to traffic of the subscribers in a coverage area of the base transceiver station and propagates the statistical information on at least one of a commercial, academic, and public basis.

In an embodiment, a processor-implemented method for analyzing call detail records to derive demographic data is disclosed. The method comprises a computer determining a projected volume of subscribers entering a coverage area of a base transceiver station during a first time period based on analysis of call detail records historically associated with the first time period and the computer determining a projected volume of subscribers entering the coverage area during a second time period based on analysis of call detail records historically associated with the second time period. The method further comprises the computer determining a first price for presenting content on a billboard located in the coverage area during the first time period, the computer determining a second price for presenting content on the billboard during a second time period, and the computer determining an actual volume of subscribers entering the coverage area during the first time period based on analysis of call detail records. The method further comprises the computer determining an actual volume of subscribers entering the coverage area during the second time period based on analysis of call detail records, the computer adapting the price for presenting content on the bill board during the first time period based on the actual volume of subscribers entering the coverage area during the first time period, and the computer adapting the price for presenting content on the bill board during the second time period based on the actual volume of subscribers entering the coverage area during the second time period.

In an embodiment, a processor-implemented method for analyzing call detail records to derive demographic data is disclosed. The method comprises a computer analyzing stored call detail records (CDR) associated with communication promoted by a base transceiver station during a first predetermined time period to estimate an average distance traveled by people from their home to a coverage area of the base transceiver station during the first predetermined time period and the computer analyzing stored call detail records associated with communication promoted by the base transceiver station during a second predetermined time period to estimate an average distance traveled by people from their home to the coverage area during the second predetermined time period. The method further comprises taking action based on the estimations of distance traveled by people in the coverage area.

In an embodiment, a system is provided. The system comprises a processor, a memory, and an application stored in the memory, that, when executed by the processor, accesses a first plurality of stored call detail records (CDR) and selects a second plurality of call detail records from the first plurality wherein the second plurality is associated with voice calls transmitted via a first base transceiver station. The system also selects a third plurality of call detail records from the second plurality wherein the third plurality comprises call detail records created during a first predetermined time period on at least a first predetermined day of one of a week and a plurality of weeks. The system also accesses subscriber records associated with the third plurality of call detail records and determines from demographic information in the subscriber records that a predetermined percentage of subscribers associated with the subscriber records exhibit a first demographic characteristic. The system also compiles statistical information linking subscribers associated with the first demographic characteristic to potential benefit associated with access to traffic of the subscribers in a coverage area of the first base transceiver station. The system also propagates the statistical information on at least one of a commercial, academic, and public basis.

In an embodiment, a processor-implemented method is provided. The method comprises a computer determining that a first plurality of subscribers exhibiting a first demographic characteristic place wireless voice calls transmitted by a first base transceiver station during at least one of a first predetermined time period and a second predetermined time period. The method also comprises the computer determining a first projected volume of a second plurality of subscribers expected to enter a coverage area of the first base transceiver station during the first predetermined time period based on a plurality of observations of a third plurality of subscribers placing wireless voice calls during a first plurality of instances of the first predetermined time period wherein the second plurality and the third plurality of subscribers exhibit the first demographic characteristic and wherein the first plurality of instances of the first predetermined time period take place over a period of one of weeks, months, and years. The method also comprises the computer determining a second projected volume of a fourth plurality of subscribers expected to enter the coverage area of the first base transceiver station during the second predetermined time period based on a plurality of observations of a fifth plurality of subscribers placing wireless voice calls during a first plurality of instances of the second predetermined time period wherein the fourth plurality of subscribers and the fifth plurality of subscribers exhibit the first demographic characteristic and wherein the first plurality of instances of the second predetermined time period take place over a period of one of weeks, months, and years. The method also comprises the computer publishing a first price for advertising content displayed in at least one of viewable and audible media proximate the first base transceiver station during the first predetermined time period wherein the first price is based on the first projected volume and wherein the advertising content is based in part on the first demographic characteristic. The method also comprises the computer publishing a second price for advertising content displayed in at least one of viewable and audible media proximate the first base transceiver station during the second predetermined time period wherein the second price is based on the second projected volume and wherein the advertising content is based in part on the first demographic characteristic. The method also comprises the computer measuring a first plurality of actual volumes of a sixth plurality of subscribers placing wireless voice calls transmitted by the first base transceiver station during a second plurality of instances of the first predetermined time period wherein the sixth plurality of subscribers exhibit the first demographic characteristic and wherein the second plurality of instances of the first predetermined time period take place over a period of one of weeks, months, and years. The method also comprises the computer measuring a second plurality of actual volumes of a seventh plurality of subscribers placing wireless voice calls transmitted by the first base transceiver station during a plurality of instances of the second predetermined time period wherein the seventh plurality of subscribers exhibit the first demographic characteristic and wherein the second plurality of instances of the second predetermined time period take place over a period of one of weeks, months, and years. The method also comprises the computer publishing a third price for advertising content displayed in at least one of viewable and audible media proximate the first base transceiver station during future instances of the first predetermined time period wherein the third price is based on the first plurality of actual volumes being observed as greater than the first projected volume and wherein the third price is higher than the first price. The method also comprises the computer publishing a fourth price for advertising content displayed in at least one of viewable and audible media proximate the first base transceiver station during future instances of the second predetermined time period wherein the fourth price is based on the second plurality of actual volumes being observed as less than the second projected volume and wherein the fourth price is less than the second price.

In an embodiment, a processor-implemented method is provided. The method comprises a computer accessing a first plurality of stored call detail records (CDR) associated with a first plurality of wireless voice calls transmitted by a first base transceiver station during a plurality of instances of a first predetermined time period. The method also comprises the computer accessing a second plurality of stored call detail records associated with a second plurality of wireless voice calls transmitted by the first base transceiver station during a plurality of instances of a second predetermined time period. The method also comprises the computer accessing a first plurality of subscriber records associated with the first plurality of stored call detail records and the computer accessing a second plurality of subscriber records associated with the second plurality of stored call detail records. The method also comprises the computer determining that a first predetermined percentage of subscribers named in the first plurality of subscriber records have billing addresses in excess of a first predetermined distance from the first base transceiver station. The method also comprises the computer determining that a second predetermined percentage of subscribers named in the second plurality of subscriber records have billing addresses less than a second predetermined distance from the first base transceiver station. The method also comprises the computer recommending that advertising content of one of national and international interest be displayed in at least one of viewable and audible media proximate the first base transceiver station during the first predetermined time period. The method also comprises the computer recommending that advertising content of local interest be displayed in at least one of viewable and audible media proximate the first base transceiver station during the second predetermined time period.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
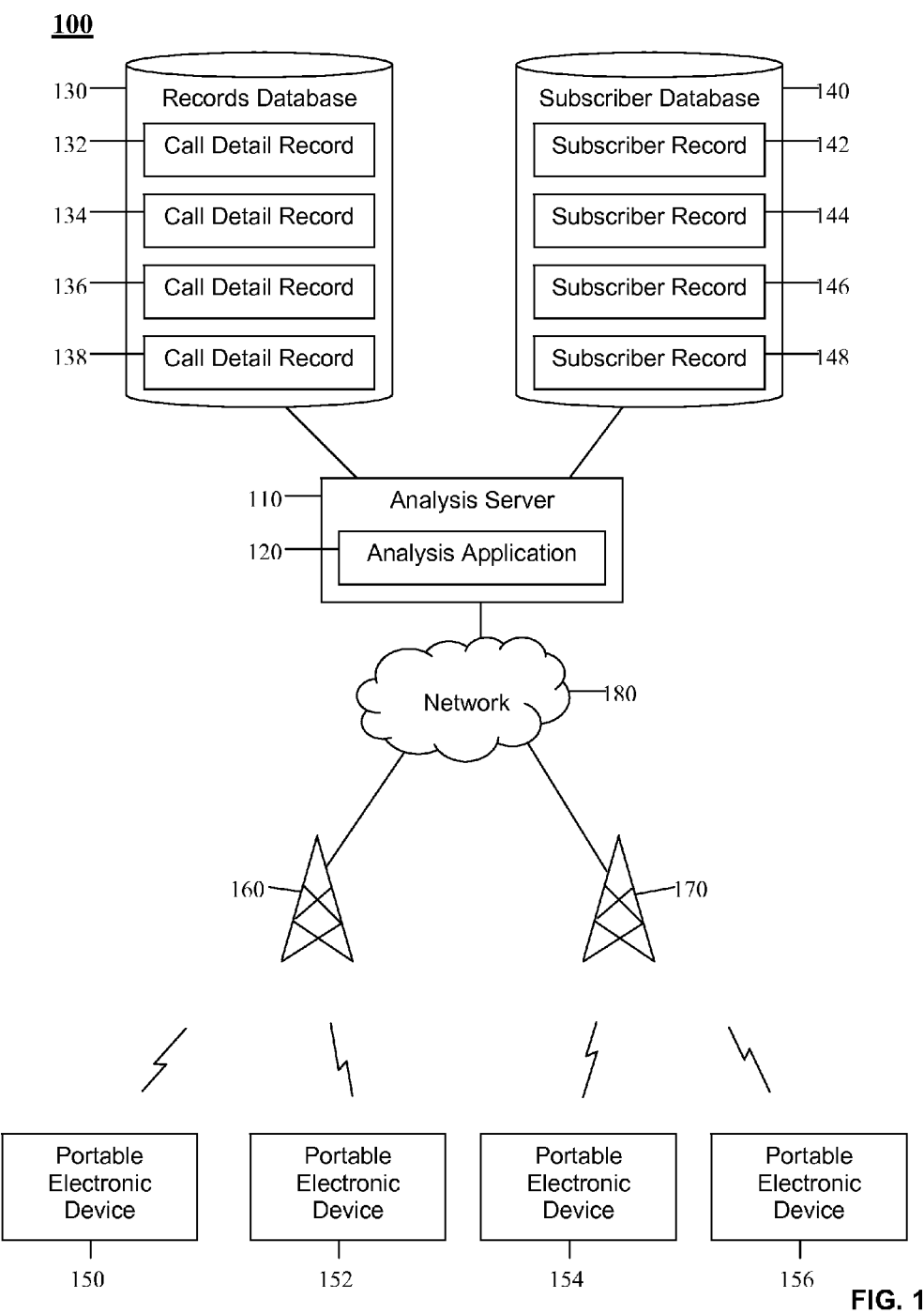
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure describes a system and methods of accessing call detail records (CDR) created for wireless telephone calls occurring during a plurality of instances of designated time periods and associated with specific wireless coverage areas. The system then accesses subscriber records associated with the call detail records and analyzes demographic and other information in the subscriber records. Analysis of subscriber information associated with the accessed call detail records for a plurality of the time period instances and the coverage area of interest supports development of inferences about socioeconomic characteristics of the subscribers. Based on the premise that the subscribers are representative of a general population of individuals passing through the coverage area during the time periods of interest, the system promotes inferences and projections about the types of individuals that pass through specific coverage areas during specific time periods whether using their devices or not. Because individuals engaged in mobile telephone conversations represent only a subset of the total number of individuals passing through a coverage area at any one time, the present disclosure teaches accessing call detail records and analyzing associated subscriber records for a plurality of samplings comprising multiple instances of the time period of interest in the chosen coverage area. Accessing of call detail records for a plurality of instances of the time period fosters the building of a statistically significant sample size and promotes the drawing of usefully accurate inferences from analysis of the associated subscriber records.

Reliable statistics about demographic and other information associated with device users passing through a coverage area during a certain time period may support inferences about the tastes and preferences of the device users and the larger population of persons in the coverage area during the time period. Decisions about the types of advertising and other content to place in billboards that may provide electronically controlled display of media viewable by device users and other individuals passing through the coverage area during the time periods of interest may be supported by information generated by the system. Pricing decisions about advertising may also be informed by the results generated and inferences arising therefrom. Reliable information about the age groups, genders, income levels, and education levels of individuals passing through coverage areas at different times of a day, days of the week, and times of the year is of value to companies and others presenting media, such as advertising, that may be viewed by these individuals as they pass through the coverage areas and view billboards and other media. Real estate developers and operators of shopping venues, for example shopping malls, may be interested in demographic and economic information about individuals that pass through certain areas in vehicles, on foot, or by another means. The present disclosure promotes projections of user tastes, preferences, and behaviors based on analysis of historical device usage by a plurality of users measured over a plurality of observation instances during the predetermined time periods and in the chosen coverage areas.

The present disclosure teaches analyzing call detail records created for wireless calls to infer traffic patterns. For example, the call detail records may be sorted according to time periods, and call detail records associated with the same time period may be analyzed. Call detail records from the time period of 7 AM to 9 AM for four sequential Mondays may be analyzed together to draw an inference about traffic patterns at the subject location from 7 AM to 9 AM on Mondays. The present disclosure teaches analysis of the call detail records and their associated subscriber records on a post-processing basis, and the making of inferences and projections for future traffic through the coverage area and time segment of interest.

In an embodiment, some call detail records and associated subscriber records may not be examined and acted upon on a real time basis. Rather, call detail records for previous periods may be accessed in bulk and sorted and/or analyzed. Inferences about the device users are drawn from analysis of subscriber records associated with the large bodies of call detail records selected for the time periods and coverage areas of interest. The subscriber records provide such information as subscriber age, gender, home address and/or zip codes, wireless subscription type, and payment information. Subscriber records may alternatively be referred to as subscriber profiles or user profiles. After further analysis, the inferences may be extended to the larger body individuals that pass through the coverage area during the time periods of interest that may not be using devices at the time or may not subscribe to the subject communication service. The extended inferences support projections useful to advertisers displaying content in billboards and other media viewable by the device users and other individuals as they pass through the specific coverage areas during the time periods of interest.

The device usage and subscriber information may also be useful on a retrospective basis to support or refute previous content and pricing decisions about billboard advertising and other media placement. The information may also be used to determine the distances that users passing through the coverage areas have traveled during various times of day i.e., how far the users are from their home addresses at the time they pass through the coverage areas of interest during the time periods of interest. This information may inform decisions about advertising content and pricing as well as promote assessments of the reach of content placed in billboards and other media.

Turning now to FIG. 1, a system 100 is provided. The system 100 comprises an analysis server 110, an analysis application 120, a records database 130, call detail records 132, 134, 136, 138, a subscriber database 140, subscriber records 142, 144, 146, 148, portable electronic devices 150, 152, 154, 156, base transceiver stations 160, 170, and a network 180. In an embodiment, the subscriber database 140 is optional and may not be part of the system 100.

The analysis server 110 is a computer system. Computer systems are described in detail hereinafter. The analysis application 120 accesses call detail records 132, 134, 136, 138 (CDR) created for a plurality of historical wireless voice calls. The calls are transmitted via the base transceiver stations 160, 170. The analysis application 120 selects call detail records 132, 134 associated with predetermined periods of time on predetermined days for at least one specific base transceiver station 160. The analysis application 120 may access, for example, call detail records 132, 134 for wireless calls originated on weekdays from 4:00 PM to 7:00 PM within the coverage area of the base transceiver station 160. The analysis application 120 may select call detail records for a plurality of instances of the predetermined time period over weeks, months, or even years. The analysis application 120 accesses subscriber records 142, 144 associated with the selected call detail records 132, 134 to extract and analyze demographic, economic and other information about subscribers engaged in the wireless calls made during the instances of the predetermined time period associated with the base transceiver station 160. As opposed to real time systems that actually measure traffic as it passes a sensor or other measurement device or apparatus, the analysis application 120 aggregates information from a plurality of the selected call detail records 132, 134 and their subscriber records 142, 144 associated with repeated instances of the time period or interval measured over the extended periods for calls associated with the base transceiver stations 160, 170.

Analysis of the selected call detail records 132, 134 and their subscriber records 142, 144 associated with the repeated intervals may identify trends or patterns in the demographic information for the portable electronic device users that may travel in the coverage area of the base transceiver station 160 during the time periods of interest. Not wishing to be bound by theory, it may be assumed that what has occurred historically, wireless communication as evidenced by the plurality of call detail records 132, 134, 136, 138, may be at least partially predictive of future activity. Established patterns of previous call activity by subscribers and others in the time periods and coverage areas of interest may be indicative of future activity. After analysis of call detail records 132, 134 and subscriber records 142, 144 associated with repeated instances of the predetermined time period, conclusions may be drawn about demographic and other characteristics of users of portable electronic devices 150, 152, 154, 156 in the coverage area of the base transceiver station 160 during the predetermined time period. Call detail records 132, 134, 136, 138 for a plurality of instances of the time period are accessed to build a statistically significant and reliable sample of subscriber records 142, 144 associated with the call detail records 132, 134. Call detail records 132, 134 for wireless calls associated with parties that are not subscribing customers of the telecommunications service provider may also be accessed and analyzed. Although subscriber records 142, 144 are not available for such parties, the call detail records 132, 134 still contain useful information. Not wishing to be bound by theory, it is assumed that a sample of traffic, as constituted by the call detail records 132, 134, 136, 138, is representative of the traffic distribution that occurs at other corresponding intervals of time.

Call detail records 132, 134, 136, 138 and their associated subscriber records 142, 144 accessed for a plurality of morning rush hour time periods, for example, may, upon analysis, provide insight about demographic characteristics of subscribers and others passing through a given coverage area during that time of day. The sample of traffic represented by the accessed call detail records 132, 134 accessed for many rush hour time periods is representative because over a plurality of instances of the time period of interest, many different subscribers and other persons pass through the coverage area, creating a large, diverse, and statistically significant sample size. Inferences drawn from the aggregated subscriber records 142, 144 may concern socioeconomic characteristics, usage patterns, and travel habits of the general population passing through the coverage area during the time period. Information developed in association with the inferences may be useful to advertisers, commercial establishments, urban planners, and others.

The present disclosure teaches the building of a sample set based on a sufficient number of instances of a time interval of interest wherein call detail records 132, 134, 136, 138 are aggregated for wireless calls associated with the time interval. In an embodiment, what may comprise a sufficient number of time intervals is related to a statistical sampling error that is acceptable to the telecommunications service provider. Sampling error is the error caused by observing a sample of occurrences instead of the entire population of occurrences. Sampling error may be controlled by taking a sufficiently large sample from the population, although the cost of doing this may be prohibitive. If the telecommunications service provider, billboard operator, advertiser, or other party using the system 100 as taught herein desires a low sampling error that may lead to more reliable results and inferences, call detail records 132, 134 associated with a large quantity of instances of the time interval of interest may be aggregated and analyzed. This may cause high costs to be incurred.

Conversely, if the party using the system 100 is willing to accept a higher sampling error that may lead to less reliable but still acceptable results and inferences, call detail records 132, 134 associated with a smaller quantity of instances of the time interval of interest may be aggregated and analyzed. It is known in the statistical art that as sample size increases, accuracy of results also increases. Larger sample sizes are associated with smaller ranges or percentages of error. Accumulating over an extended period of time, for example months, an aggregation of call detail records 132, 134, 136, 138 for many instances of the time period of interest results in a larger sample set. In combination with the present disclosure, one skilled in the art will be able to readily determine an appropriate sample size wherein the sampling error is acceptable.

For example, the telecommunications service provider may be interested in the time period of 7:00 AM to 10:00 AM on Tuesdays only. The telecommunications service provider may have been contacted by a billboard operator considering pricing of advertising on a billboard during that time period on Tuesdays. If the telecommunications service provider aggregates call detail records 132, 134 only associated with the 7:00 AM to 10:00 AM time period for the last four Tuesdays, totaling twelve total hours of sampling, the sampling error may be higher and statistical results and inferences drawn therefrom may be less reliable than if more sampling was done. The telecommunications service provider may instead decide to aggregate call detail records 132, 134 associated with the 7:00 AM to 10:00 AM time period for the last forty Mondays totaling one hundred twenty hours of sampling. This may create a sample size about ten times larger than previously but the sampling error is reduced. The reduced sampling error may be associated with more accurate inferences drawn from analysis of the data. In an embodiment, rather than the number of time intervals analyzed being selected to control sampling error, the number of call detail records may be selected to control sampling error.

The telecommunications service provider may have millions of wireless subscribers that use portable electronic devices 150, 152, 154, 156 and that pass through the coverage areas of a plurality of base transceiver stations 160, 170 at various times of day, days of the week, and times of year. The telecommunications service provider may have control over or access to call information associated with the base transceiver stations 160, 170. Call detail records 132, 134 may be created and stored by the telecommunications service provider when the subscribers place or receive wireless voice calls while in the coverage areas of the base transceiver stations 160, 170.

The identities of and demographic and other information about the subscribers using their portable electronic devices 150, 152, 154, 156 while within the coverage area of one or more of the base transceiver stations 160, 170 during certain time periods may be of value to entities placing advertising and other content in billboards viewable from within the coverage area. The telecommunications service provider may, for example, be interested in subscriber traffic passing through the coverage area of the base transceiver station 160 during a specific period of a day, for example morning or evening rush hour periods or during the early afternoon. The base transceiver station 160 of interest may be positioned near a major highway. Billboards viewable from the highway may display advertising or other content that is viewable by thousands of persons per hour.

Operators of billboards and the entities that contract to advertise content in the billboards may vigorously bargain on price of advertising at various times of day and days of the week. Demographic and socioeconomic information about population segments passing the billboards during various time periods may be valuable in content selection and pricing discussions. The information generated by the system 100 about subscribers and others in the coverage area refers to the quantities and characteristics of persons passing through the coverage area. It does not guaranty that these persons view or even see a billboard of interest. Traffic flow does not guaranty viewership of a billboard. What percentage of persons passing through the coverage area see, read, and remember content in a billboard may be determined by other methods outside the scope of the present disclosure. For example, if it determined that traffic flows very slowly through a coverage area during a time period of interest, it may be inferred that a billboard is viewed more often than otherwise. This accuracy of this inference may be substantiated by other methods.

The telecommunications service provider or other entity may use the system and methods taught herein to identify prevalent characteristics of subscribers and other persons traveling in a coverage area of interest during the time periods of interest. For example, during the early afternoon on weekdays, a majority or statistically significant portion of subscribers passing through the coverage area may be women with young children. During rush hours, subscribers may be predominantly income earners. These rush hour subscribers may be further segregated by age groups and gender. Advertising for the billboards may be selected and priced based on prevalent demographic and socioeconomic characteristics of subscribers known to be passing through the coverage areas at the various times. Because subscribers of the telecommunications service provider currently using their portable electronic devices 150, 152, 154, 156 while passing through the coverage area of the base transceiver station 160 comprise only a portion of the total number of people passing through the coverage area, a number of instances of the time period of interest are subject to analysis to access a statistically reliable sample of call detail records 132, 134 and their associated subscriber records 142, 144.

Analysis of subscriber records 142, 144 associated with call detail records 132, 134 promotes identification of characteristics of subscribers using the portable electronic devices 150, 152, 154, 156 that pass within proximity of base transceiver stations 160, 170 while traveling in vehicles, while on foot, or in another manner. The analysis application 120 analyzes subscriber records 142, 144 to compile statistical and other information about characteristics of subscribers passing within proximity of base transceiver stations 160, 170 at various times of day and days of the week. The analysis application 120 assembles the information in sample sizes that are may be statistically significant and therefore may be reliable for purposes of drawing inferences about subscribers and their behaviors as well as about the general population in the coverage area during the time period.

Through repeated access of call detail records 132, 134 and associated subscriber records 142, 144 for wireless calls during the time period of interest across weeks or months, the analysis application 120 performs a plurality of statistical operations using the gathered information to infer characteristics of users passing through base transceiver station coverage areas at various times of day on different days of the week and times of a month. The compiled and processed information may be of value in selection and pricing of advertising and other content placed in billboards and other display media near the base transceiver stations 160, 170 that the users contact during wireless calls. The information may additionally be useful to commercial and other venues seeking to gather demographic and economic information about persons traveling within proximity of the venues.

The present disclosure teaches the reliance on information extracted from stored call detail records 132, 134, 136, 138 about wireless telephone calls occurring during a plurality of previous time periods. Historical information is accessed, analyzed, and used to develop premises and make inferences about types of user traffic in future time periods. The system is based on a post-processing approach wherein projections are made about future user traffic based on analysis of past traffic patterns in specific coverage areas during various time periods on various days and at various times of year. Gathering of sufficiently large sample sizes of call detail records 132, 134 and associated subscriber records 142, 144 may enable projections about the quantities and types of traffic that may pass through base transceiver station coverage areas during various time periods. Projections may be made about age group, gender, income levels, and other demographic variables associated with user traffic.

The system imposes little or no additional information cost on the telecommunications service provider since the call detail records 132, 134 and subscriber records 142, 144 have already been created and retained for other reasons. The call detail records 132, 134 and their associated subscriber records 142, 144 selected for analysis may require no modification for purposes of this disclosure. This contrasts with other implementations that may capture information using specially-installed sensors or other additional hardware at the point of data capture, for example in the field at the points where the subscribers of interest and their portable electronic devices 150, 152, 154, 156 physically pass. No component of the system 100 communicates with or senses the actions of the portable electronic devices 150, 152, 154, 156 on a real time basis.

In addition, the selection of the call detail records 132, 134 of interest, the accessing of associated subscriber records 142, 144, and the analysis of data contained in the subscriber records 142, 144 may be done by a single computer, for example the analysis server 110 taught herein. The analysis server 110 may be at a single location, far removed from the base transceiver stations 160, 170, for example at remote premises of the telecommunications service provider. The processing by the analysis application 120 may be done during off hours during periods of low system usage. The system and methods described herein place little additional processing burden on existing enterprise systems. By identifying the segments of population that typically pass certain base transceiver stations 160, 170 at various times of the day and days of the week, the analysis application 120 can present the aggregated and processed information and associated inferences that may be valuable to various parties including advertisers and operators of commercial establishments.

Call detail records 132, 134 are produced by telephone exchanges that contain details of phone calls that pass through the telephone exchanges. The call detail record 132 comprises fields describing a phone call including the phone numbers of the calling party, the called party, the date and time of the call, the duration of the call, and other information. The telecommunications service provider may accumulate and store thousands or millions of call detail records 132, 134, 136, 138 associated with wireless calls placed and received by portable electronic devices 150, 152, 154, 156. Call detail records 132, 134, 136, 138 may be linked with subscriber records 142, 144, 146, 148 maintained by the telecommunications service provider. A plurality of demographic, socio-economic, and financial information may be contained in the subscriber records 142, 144, 146, 148 or available from other sources via reference to the subscriber records 142, 144, 146, 148. The analysis application 120 may access a plurality of this information associated with users of portable electronic devices 150, 152, 154, 156 engaging in calls that contact base transceiver stations 160, 170 of interest.

Call detail records 132, 134, 136, 138 may also identify or contain references to information that identifies at least one base transceiver station 160 with which the portable electronic device 150 has contact during a wireless voice call. Base transceiver stations 160, 170 are pieces of equipment that facilitate wireless communication between user equipment (UE), for example the portable electronic devices 150, 152, 154, 156, and a network, for example the network 180. Base transceiver stations 160, 170 contain transceivers for transmitting and receiving radio signals, antennas, and equipment for encrypting and decrypting communications with base station controllers (BSC). While base transceiver stations 160, 170 may be commonly referred to as "cell towers", the base transceiver station 160 is a unit that normally is located at the base of a tower that contains an antenna for transmission and receipt of wireless signals. Some base transceiver stations 160, 170 are not associated with physical towers wherein their associated transceivers may be affixed to the side of a building or on a water tower, for example. While not depicted in FIG. 1, a plurality of base transceiver stations 160, 170 may transmit with a base station controller that handles allocation of radio channels, receives measurements from the mobile phones, and controls handovers between base transceiver stations 160, 170. Base station controllers communicate with a smaller number of mobile switching centers (MSC), also not depicted in FIG. 1, where call detail records 132, 134, 136, 138 are created. The network of the telecommunications service provider may be structured to have many base station controllers distributed into regions near their base transceiver stations 160, 170 with the base station controllers then connected to large centralized mobile switching centers sites. In an embodiment, the analysis server 110 is located at a mobile switching center site.

The telecommunications service provider may, for example, be contacted by an operator of billboards that are visible from a highway within the coverage area of the base transceiver station 160. The telecommunications service provider may own, operate, or otherwise have access to the base transceiver station 160. The operator of billboards may be interested in the types of consumers that pass its billboards as the consumers pass the billboards while traveling on the highway at various times of days on both weekdays and weekends. The billboard operator may use information about the consumers to set pricing for content advertised in its billboards. The billboard operator may change the content displayed in the billboard and/or the pricing of the content at various times of day depending on the types of consumers passing the billboard. The information about consumers may be used retrospectively to verify for an advertiser that a projected volume of a certain type of consumer did or did not in fact pass through the coverage area during a predetermined time period. This information may be used by the billboard operator to make adjustments to the content and/or the pricing of the advertising content displayed in a billboard in the coverage area during the time period. In an embodiment, an entity that is contemplating the placement of advertising in a billboard may contract with the telecommunications service provider for this information before approaching the billboard operator to discuss pricing for the content placement.

The telecommunications service provider may be contacted by a manufacturer of consumer products that is interested in advertising its products on billboards in a segment of a highway within the coverage area of the base transceiver station 160. The manufacturer may, for example, be interested in a time period of 2:00 PM to 4:30 PM from Monday to Friday. The manufacturer may believe that during this time period a significant volume of portable electronic device users on the segment of highway are mothers of school-age children. The manufacturer, that may produce children's athletic shoes, for example, may wish to secure information testing its beliefs about consumer traffic on the highway before entering discussions with the operator of the billboards about pricing for advertising during the 2:00 PM to 4:30 PM time period. The manufacturer may seek reliable information about established traffic patterns during this time period over an extended period of weeks, months, or years.

The telecommunications service provider may begin by causing the analysis application 120 to access the records database 130 that may contain all call detail records 132, 134, 136, 138 associated with its subscribers. The records database 130 may store many millions of call detail records 132, 134, 136, 138 accumulated over the previous year or several years. The analysis application 120 may then search the call detail records 132, 134, 136, 138 extracted from the records database 130 for those associated with the coverage area of interest. The coverage area is associated with the base transceiver station 160 proximate to the highway and the billboard in which the manufacturer is interested in displaying advertising about its products during 2:00 PM to 4:30 PM weekday time period.

When the analysis application 120 has extracted and isolated the call detail records associated with the base transceiver station 160 of interest, it may then apply search techniques to further isolate call detail records 132, 134 for wireless calls occurring during the 2:00 PM to 4:30 PM time period from Monday through Friday. The call detail records 132, 134 may have time stamps indicating the date and time of the wireless call. The analysis application 120 may access call detail records 132, 134 having a timestamp of this weekday afternoon time period for the base transceiver station 160 of interest for wireless calls in the previous month, six months, year, or other period. The analysis application 120 in this example may exclude call detail records 132, 134 for summertime months since school is not in session and mothers of school-age children may have different driving patterns and telephone usage habits during these months.

Once the analysis application 120 has isolated a plurality of call detail records 132, 134 for wireless calls associated with the base transceiver station 160 with the coverage area including the billboards of interest to the manufacturer and occurring during the 2:00 PM to 4:30 PM weekday time period, the analysis application 120 may begin accessing and analyzing data about the wireless subscribers associated with the selected call detail records 132, 134. The analysis application 120 accesses the subscriber database 140 and extracts subscriber records 142, 144 associated with the selected call detail records 132, 134. The subscriber records 142, 144 contain information about the subscribers involved in the wireless calls documented by the selected call detail records 132, 134. The subscriber records 142, 144 may contain the names, genders, ages, addresses, number, ages and genders of children, credit information, and wireless account information for the subscribers. The subscriber records 142, 144 may also contain links or references to additional information about the subscribers such as the income levels, occupation, and education of the subscribers.

The analysis application 120 then has in its possession the information it needs to perform statistical and other analyses and to assist the manufacturer with determining whether a satisfactory quantity and percentage of the target audience (mothers of school age children) pass through the coverage area of the base transceiver station 160 during the time period of interest, 2:00 PM to 4:30 PM on weekdays in this example. For subscribers engaged in wireless calls during the time period and in the coverage area of interest, the analysis application 120 has access via the subscriber records 142, 144 to information that will assist in determining whether those subscribers fit into the target audience desired by the manufacturer.

Depending on specifications provided by the manufacturer in this example, the analysis application 120 may seek information about the gender and average age of subscribers using their portable electronic devices 150, 152 during the time period as they pass through the coverage area of interest. Since the analysis application 120 has accessed and isolated subscriber records 142, 144 for subscribers passing through the coverage area of the base transceiver station 160 during a plurality of instances of the 2:00 PM to 4:30 PM weekday time period, the analysis application 120 may determine the percentage of these subscribers that are female and within an age range of 24 years old to 40 years old. This age range may be specified by the manufacturer as appropriate for mothers of school-aged children. The manufacturer may also be interested in subscriber information when accessed call detail records 132, 134 are associated with subscriber records 142, 144 for subscribers or users aged 7 years old through 14 years old that may be an age range for children that comprise the target market for the footwear the manufacturer seeks to advertise.

The analysis application 120 performs statistical operations on the subscriber records 142, 144 associated with the accessed call detail records 132, 134 to determine the volumes of the subscribers that are female and fall within the target age range or are either male or female and fall within the 7 to 14 year old age range. Statistical techniques may be used to avoid double counting or other statistical pitfalls and determine valid percentages and other measures. The analysis application 120 may determine average percentages of subscribers during the 2:00 PM to 4:30 PM weekday target time period that fit within the target specifications and report this information to the manufacturer. The analysis application 120 may provide breakdowns of the information across different time slices or segments within the target time period and may report how these percentages may rise and fall during the time period. The analysis application 120 may describe noteworthy concentrations of target subscribers at various times within the target time period or on various days of the week. In an embodiment, the analysis application 120 draws on stored information that has been previously aggregated and processed about subscribers' behavior from previous months or years. The analysis application 120 may use this stored information in combination with newly aggregated and processed information to develop refined inferences about subscriber tastes, preferences, and behaviors.

The telecommunications service provider may provide the results produced by the analysis application 120 to the billboard operator, advertiser, or other requesting party in a single or periodic hard-copy or electronic report or reports. The results may be displayed in graphic form depicting the volumes of different types of persons projected to pass through coverage areas of interest during different time periods of interest. In an embodiment, the telecommunications service provider may provide this information on a regular ongoing basis, for example by subscription. For example, the telecommunications service provider might, every ninety days, provide a report with statistics and projections about the persons passing through the coverage area of interest at different times of the day and days of the week. Instead of sending the information to the billboard operator or advertiser, the telecommunications service provider may post the information to a private Internet website and the billboard operator or advertiser may access the information remotely and at a time of its convenience. In an embodiment, the telecommunications service provider may produce this information and may release it on a commercial basis to a plurality of customers that may be interested in the information for various commercial and non-commercial reasons. In an embodiment, the telecommunications service provider may distribute this information through third party providers such as consulting organizations and the third party providers may sell the information to a plurality of different parties and on terms of the third party providers' choosing.

The information about volumes of subscribers of interest passing through the coverage area of the base transceiver station during the 2:00 PM to 4:30 PM weekday target period may be of value to the manufacturer in negotiating with the owner or operator of billboards in the coverage area for advertising during the target time period or during other times. The information may be useful in negotiating advertising rates for billboard content during the target period. If the operator of the billboards and/or an advertising agency or other party representing the manufacturer has contracted with the telecommunications service provider for services associated with the present disclosure, that party may likewise use the information and associated inferences in discussions about the setting of or adjustment to advertising rates.

In another example, the analysis application 120 may access call detail records 132, 134 during a plurality of evening or morning rush hour periods, for example 7:00 AM to 10:00 AM or 4:00 PM to 7:00 PM, respectively, on weekdays. The accessing of the call detail records 132, 134 and the analysis of associated subscriber records 142, 144 may not take place for all five days of the week, Monday through Friday, but may be confined to fewer days, for example Mondays only or Fridays only. The analysis application 120 may instead perform these activities for a plurality of time periods on weekends. During the rush hour periods, the results of the activities of the analysis application 120 may lead to conclusions that a substantial percentage of motorists or others passing through the coverage area are traveling to or from their workplaces. Further analysis may reveal that the users of portable electronic devices 150, 152, 154, 156 are substantially male or female persons falling within certain age ranges. This information may inform advertising content and pricing decisions for billboards in the coverage area of the at least one base transceiver station 160, 170 of interest.

The users of portable electronic devices 150, 152, 154, 156 passing through the coverage areas of the base transceiver stations 160, 170 at any given time represent only a portion or fraction of the total number of persons passing through the coverage areas at the time. Some of the persons not identifiable by call detail records 132, 134 and associated subscriber records 142, 144 may be subscribers of the telecommunications service provider that are not presently using their portable electronic devices 150, 152, 154, 156 while in the coverage areas. Other persons may be users of portable electronic devices 150, 152, 154, 156 under subscription arrangements with other telecommunications service providers or other entities that may or may not be using their portable electronic devices 150, 152, 154, 156 at the time. If a user on a voice call is a subscriber of wireless voice services with an entity other than the telecommunications service provider, the telecommunications service provider may be unable to view subscriber information for that user but may still access a call detail record 132 for that wireless call and increment some of its metrics or counts. The telecommunications service provider may include the call detail record 132 in an overall count of users passing through the coverage area and this information may be of value. Other persons passing through the coverage may not be users of portable electronic devices 150, 152, 154, 156 at all but their presence in the coverage area is noteworthy in estimating total quantities of persons passing through the coverage area.

Because the users of portable electronic devices 150, 152, 154, 156 passing through the coverage areas of the base transceiver stations 160, 170 at a given time represent a fraction of the total number of persons passing through the coverage areas, the present disclosure teaches the accessing of call detail records 132, 134 for many instances of the time period of interest. For example, the analysis application 120 may extract call detail records 132, 134 and their associated subscriber records 142, 144 for a 4:00 PM to 7:00 PM time period for Fridays only and may examine this information for a sample size comprising the previous six months, or three hour samples for a sequence of about twenty-five consecutive Fridays. The accumulation of records associated with an extended period of time promotes the building of a body of data from which accurate inferences are more likely to be drawn. The use of a plurality of instances of the time periods may promote a normalization of measured counts. Adjustments may be made for habitual behavior such as individuals associated with a first demographic characteristic engaging in lengthier telephone conversations than individuals associated with a second or opposite demographic characteristic, or for the likelihood that automobiles during rush hour periods are more likely to be carrying one person than during other times.

The telecommunications service provider, after accessing and analyzing call detail records 132, 134 and their associated subscriber records 142, 144 associated with a plurality of instances of the time period of interest and the coverage area of interest, develops inferences about correlations between statistics and traffic rates. The telecommunications service provider may infer that during the time period of interest, certain percentages of subscribers and others passing through the coverage area exhibit a demographic characteristic of interest. This inference may be made after analysis of many instances of the time period of interest, permitting the building of a sample of acceptable size with a sampling error at an acceptable level. While subscribers and others currently using their portable electronic devices 150, 152, 154, 156 at a given time represent only a portion of the total quantity of persons passing through the coverage area during the time period, the building of the sample of an acceptable size and analysis of the data more likely permits the telecommunications service provider to draw accurate inferences about the total volume of traffic through the coverage area during the time period.

For example, the telecommunications service provider may determine that at any given time 10% of men are using their portable electronic devices 150, 152, for example through observation means not related to the presently disclosed system for analyzing call detail records. The telecommunications service provider may combine this information with the results of analysis of call detail records to more accurately project the number of men traveling through a monitored region. For example, the telecommunications service provider may examine the quantity of call detail records 132, 134 during instances of the time period wherein the user is a man. If, in this example, an average of 300 call detail records 132, 134 during the time period are found to be associated with male users, it may be inferred that the total number of men passing through the coverage area during the time period is 3000. This information may inform content and pricing decisions by advertisers and operators of billboards in the coverage area that may be viewed by the men passing through.

In another example, the telecommunications service provider may determine that at any give time 25% of women are using portable electronic devices 150, 152, for example through observation means not related to the presently disclosed system for analyzing call detail records. The telecommunications service provider may combine this information with the results of analysis of call detail records to more accurately project the number of women traveling through a monitored region. For example, the telecommunications service provider may examine the quantity of call detail records 132, 134 during instances of the time period wherein the user is a woman. If, in this example, an average of 300 call detail records 132, 134 during the time period are found to be associated with female users, it may be inferred that the total number of women passing through the coverage area during the time period is 1200. The observation means may be studies conducted by third parties and/or ratings type of data collection companies. The observation means may be another system for determining the information, for example other analysis programs executed by the telecommunications service provider in support of other activities, for example in support of sales and/or marketing activities.

Analysis of additional data available from other sources may show that a significant portion of those women are driving vehicles in which at least one young child is a passenger. The supplemental data about children as passengers accompanying the women motorists may provide further support for some content and pricing decisions about advertising during the 2:30 PM and 4:00 PM weekday time period. Based on the information generated by the analysis application 120, inferences drawn therefrom, and the supplemental data, the billboard operator may advertise products or services of interest to families with young children during the time period.

The aggregation and statistical processing and manipulation of the data associated with the call detail records 132, 134 and their associated subscriber records 142, 144 is done on a lagging, post-processing basis. Inferences may not be made until statistics have been gathered about wireless call activity over a number of weeks or months, for example. It may be performed well after the fact as opposed to a more real time approach that may be taught in previous implementations.

The results generated by the analysis application 120 and the inferences drawn from the results may be used in developing projections about the types of users passing through the coverage areas of base transceiver stations 160, 170 of interest during time periods of interest. As noted, the projections may be used in content and pricing decisions for advertising in billboards and other media viewable by motorists and others in the coverage area. The analysis application 120 may also similarly generate results that may be used on an after-the-fact basis to support or refute projections previously made by the analysis application 120 or by another means. The results may be used by a manufacturer or other vendor of products, for example, in discussions with an operator of billboards about placement and pricing of advertising content, including discussions about increases, decreases, or other changes to existing pricing arrangements.

The output generated by the analysis application 120 may also be examined to determine the distances traveled by users of the portable electronic devices 150, 152, 154, 156 as they pass through the coverage areas of the base transceiver stations 160, 170 during periods of interest or at all times. Information about where motorists may have traveled from as they travel through a coverage area may be valuable in assessing "reach" or exposure of advertising content. Billboards in a coverage area that receives traffic from primarily local persons, for example persons with home addresses within fifteen miles may display different content than billboards in a coverage area wherein traffic comprises persons primarily residing significantly further, for example beyond fifty miles from the coverage area. Accessed call detail records 132, 134 and their associated subscriber records 142, 144 may reveal home address information for motorists or others passing through the coverage area. This information may be useful in determining distance traveled by motorists or others.

In an embodiment, the average distance traveled by motorists or the average distance of motorists' home addresses from the coverage area may vary at different times of a day or days of a week. For example, a billboard in a coverage area of the base transceiver station 160 may be located close to an international airport. During daytime hours, the analysis application 120 may conclude from its aggregated and processed data that motorists passing the billboard primarily reside beyond a fifty mile, a two hundred mile, or a five hundred mile radius of the base transceiver station 160, for example. Advertising of products or services of national or international interest may be placed in the billboard during the daytime hours because of the information determined about the disperse residence addresses of the daytime motorists. By contrast, during nighttime hours, for example between 10:00 PM and 5:00 AM, when the international airport is closed or inactive, the analysis application 120 may determine that traffic passing through the coverage area comprises primarily locally residing persons, for example those residing within a five mile radius, a ten mile radius, and a twenty mile radius of the base transceiver station 160. For this reason, products or services of local interest, such as the products of a local automobile dealership or an announcement of an event of local interest may be advertised by the billboard during the nighttime period. In an embodiment, the daytime period for accessing call detail records 132, 134 is one of three hours, five hours, and eight hours in duration and the nighttime period is one of five hours, eight hours, and twelve hours in duration.

While the discussion thus far has primarily concerned interactions of users of portable electronic devices 150, 152, 154, 156 within a single coverage area associated with a single base transceiver station 160, the present disclosure also teaches analysis of portable electronic device user activity through a sequence or progression of coverage areas associated with two or more base transceiver stations 160, 170 that may be proximate each other. The analysis application 120, by examining a plurality of call detail records 132, 134 and their associated subscriber records 142, 144 associated with base transceiver stations 160, 170 that may effectively "hand off" coverage to each other, may assist in the development of further inferences about subscriber activity. When this expanded body of intelligence about subscriber movement is combined with demographic and other information drawn from subscriber records 142, 144, additional inferences may be drawn. It may be useful to determine, for example, that on weekends, a sequence of coverage areas along a major highway are heavily traveled by male motorists in the 17-34 year old age group while on weekdays, the same sequence of coverage areas is more heavily traveled by female motorists. This information may inform decisions about the type of content to advertise in billboards along the major highway on weekends versus weekdays. Understanding routes traveled by various sectors of population may also assist an advertiser from unnecessarily duplicating advertising messages to the same sector of population on a succession of billboards. A billboard operator or other advertiser may use the information provided by the analysis application 120 about routes traveled to display a series of advertisements along a sequence of billboards along a route determined to be traveled by a demographic segment of population.

In addition to operators of billboards and other viewable mass display media, the analysis application 120 may also be of value to real estate developers, urban planners, restaurant developers, and operators of shopping malls and other venues accessible to large masses of population. These parties may be interested in volumes of motorist traffic and pedestrian traffic at various times of day and days of the week that pass thorough the coverage areas of specific base transceiver stations 160, 170. Analysis of call detail records 132, 134 and their associated subscriber records 142, 144 accessed during repeated instances of a specific time period of day, for example, may promote these entities to draw useful inferences about the demographic and economic characteristics of persons passing through the coverage areas of interest.

The telecommunications service provider, in addition to propagating the information and inferences produced by the analysis application 120 on a commercial basis to billboard operators, advertisers, and vendors of products, may also make the information available to urban planners and academicians for non-commercial use. In an embodiment, time periods of interest for which call detail records 132, 134, 136, 138 may be accessed and analyzed may be about one hour, about three hours, and about five hours in duration.

The base transceiver stations 160, 170 may be any of cellular wireless base transceiver stations, for example Code Division Multiple Access (CDMA), Global System for Mobile Communications (GSM), Universal Mobile Communications System (UMTS), and/or Long-term Evolution (LTE) cellular wireless base transceiver stations; World-wide Interoperable Microwave Access (WiMAX) base transceiver stations; WiFi access points; femtocells; or other wireless access devices.

While FIG. 1 depicts the portable electronic devices 150, 152 transmitting wirelessly with the base transceiver station 160 and depicts the portable electronic devices 154, 156 transmitting wirelessly with the base transceiver station 170, in an embodiment any of the portable electronic devices 150, 152, 154, 156 may transmit wirelessly with either of the base transceiver stations 160, 170 while in their coverage areas or with other base transceiver stations not depicted in FIG. 1.

The network 180 promotes communication between the components of the system 100. The network 180 may be any communication network including a public data network (PDN), a public switched telephone network (PSTN), a private network, and/or a combination thereof.

In an embodiment, the system 100 may implement a method for analyzing call detail records to derive demographic data. The method comprises a computer determining a projected volume of subscribers entering a coverage area of a base transceiver station during a first time period based on analysis of call detail records historically associated with the first time period and the computer determining a projected volume of subscribers entering the coverage area during a second time period based on analysis of call detail records historically associated with the second time period. The method further comprises the computer determining a first price for presenting content on a billboard located in the coverage area during the first time period, the computer determining a second price for presenting content on the billboard during a second time period, and the computer determining an actual volume of subscribers entering the coverage area during the first time period based on analysis of call detail records. The method further comprises the computer determining an actual volume of subscribers entering the coverage area during the second time period based on analysis of call detail records, the computer adapting the price for presenting content on the bill board during the first time period based on the actual volume of subscribers entering the coverage area during the first time period, and the computer adapting the price for presenting content on the bill board during the second time period based on the actual volume of subscribers entering the coverage area during the second time period.

The system 100 may alternatively or additionally implement another method for analyzing call detail records to derive demographic data related to distance people travel from their homes to be in a coverage area of a base transceiver station. The method comprises a computer analyzing stored call detail records (CDR) associated with communication promoted by a base transceiver station during a first predetermined time period to estimate an average distance traveled by people from their home to a coverage area of the base transceiver station during the first predetermined time period and the computer analyzing stored call detail records associated with communication promoted by the base transceiver station during a second predetermined time period to estimate an average distance traveled by people from their home to the coverage area during the second predetermined time period. The method further comprises taking action based on the estimations of distance traveled by people in the coverage area. The actions can include adapting advertising or other content presented on billboards in the coverage area based on analysis of how far people travel from their homes or where most of their homes are located. The actions can include retail stores located within the coverage area adapting sales offerings and/or pricing of products based on the average estimated distance people within the coverage area traveled from their homes.

The method may index from the call detail records to profiles and/or historical data of subscribers associated with the call detail records, and based on analyzing the profiles and/or historical data identify or infer a virtual "home" of each subscriber corresponding to a geographical center of mass of the events recorded in the profiles and historical data of the subject subscriber. The virtual home may be more useful than the official mailing address associated with the subscription account associated with a portable electronic device 150, 152. The subscriber may have moved their residence but not updated their subscription address because they conduct their billing on-line electronically. The actual user of the portable electronic device 150, 152 may be a child living away from the subscriber, such as a college student living away from their parents who are the actual subscribers, such that the subscription address differs from the main location of the user. Zip codes associated with subscriber addresses can be analyzed and counts of call detail records associated with the same zip codes can be accumulated. This may promote calculating distance once to the center of mass of the zip code, thereby providing calculation efficiencies. Further, zip codes may be used to access other demographic or contextual information, such as the type of area as being metropolitan area, suburban area, rural area, and other area types.

The method can establish different categories of distances people travel to the coverage area and aggregate statistics on each of these different categories with reference to the coverage area. Alternatively, the method can establish different categories of types of areas people travel from to the coverage area and aggregate statistics on each of these categories with reference to the coverage area. The method can accumulate statistics on how often individuals visit the coverage area—daily, weekly, monthly, or never before.

Figure 2A:
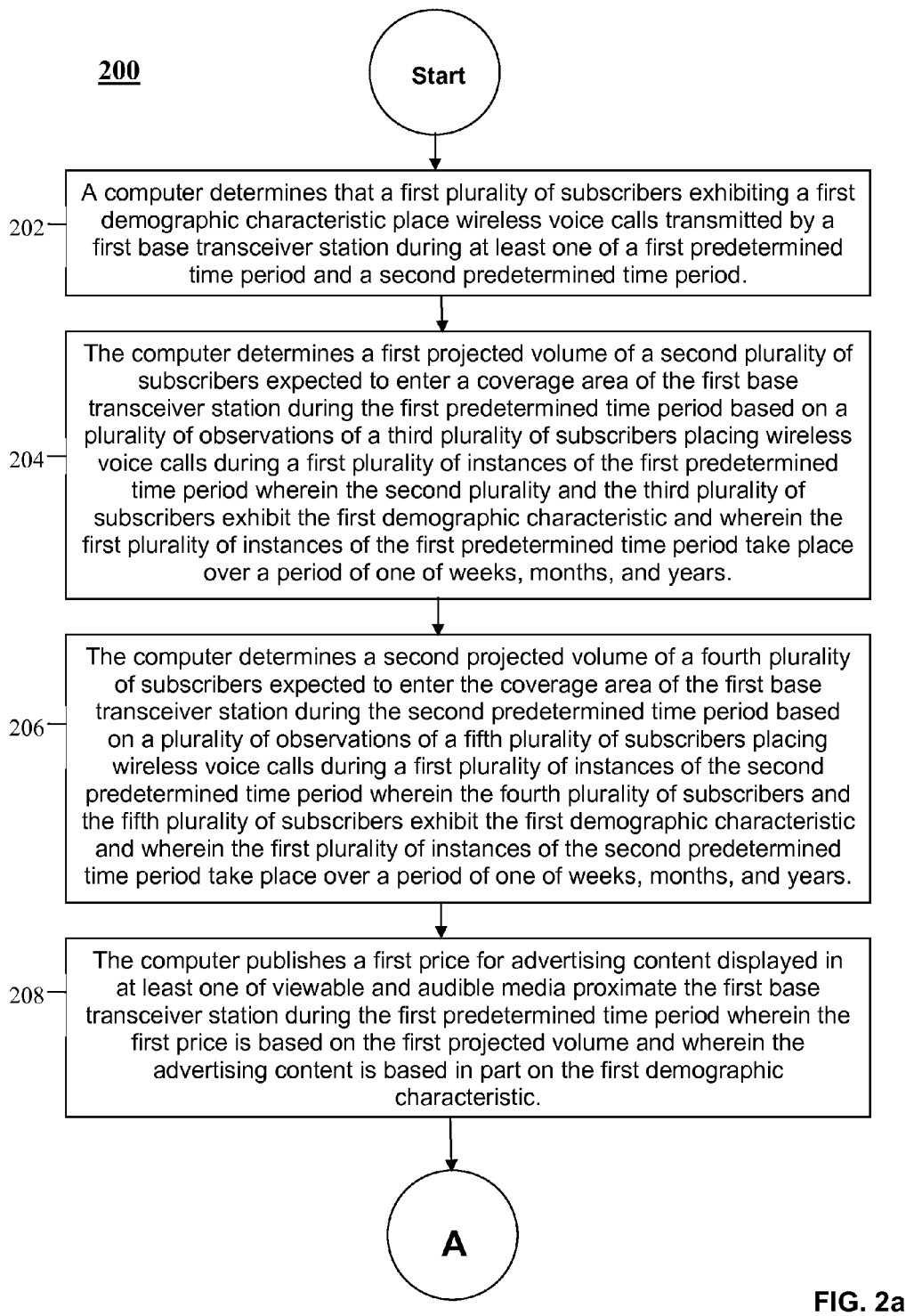
FIG. 2a is a flow chart illustrating a method according to an embodiment of the disclosure.
Figure 2B:
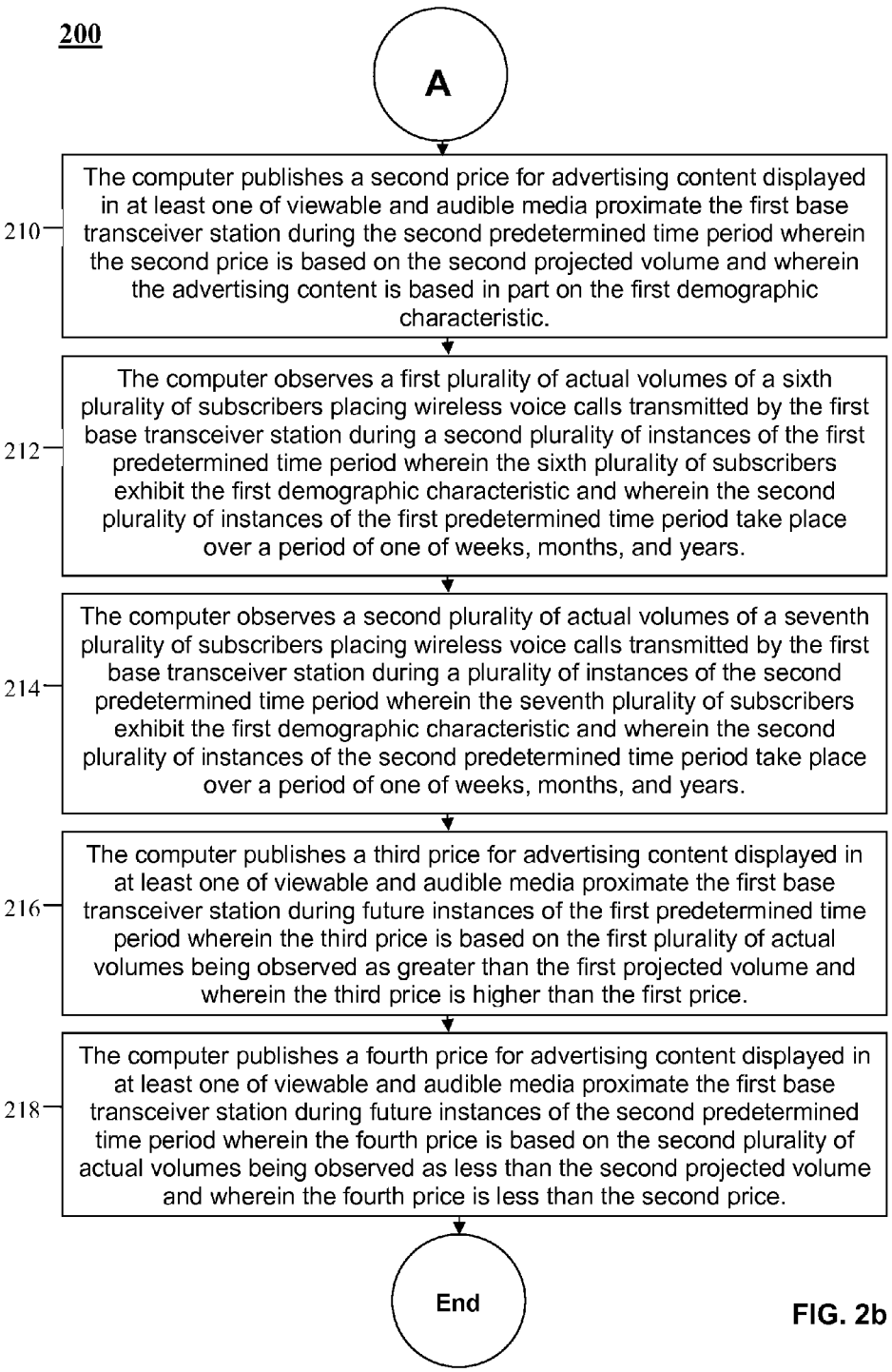
FIG. 2b is a flow chart illustrating a method according to an embodiment of the disclosure.

Turning now to FIG. 2a and FIG. 2b, a processor-implemented method 200 is described. Beginning at block 202, a computer determines that a first plurality of subscribers exhibiting a first demographic characteristic place wireless voice calls transmitted by a first base transceiver station during at least one of a first predetermined time period and a second predetermined time period.

At block 204, the computer determines a first projected volume of a second plurality of subscribers expected to enter a coverage area of the first base transceiver station during the first predetermined time period based on a plurality of observations of a third plurality of subscribers placing wireless voice calls during a first plurality of instances of the first predetermined time period wherein the second plurality and the third plurality of subscribers exhibit the first demographic characteristic and wherein the first plurality of instances of the first predetermined time period take place over a period of one of weeks, months, and years.

At block 206, the computer determines a second projected volume of a fourth plurality of subscribers expected to enter the coverage area of the first base transceiver station during the second predetermined time period based on a plurality of observations of a fifth plurality of subscribers placing wireless voice calls during a first plurality of instances of the second predetermined time period wherein the fourth plurality of subscribers and the fifth plurality of subscribers exhibit the first demographic characteristic and wherein the first plurality of instances of the second predetermined time period take place over a period of one of weeks, months, and years.

At block 208, the computer publishes a first price for advertising content displayed in at least one of viewable and audible media proximate the first base transceiver station during the first predetermined time period wherein the first price is based on the first projected volume and wherein the advertising content is based in part on the first demographic characteristic.

At block 210, the computer publishes a second price for advertising content displayed in at least one of viewable and audible media proximate the first base transceiver station during the second predetermined time period wherein the second price is based on the second projected volume and wherein the advertising content is based in part on the first demographic characteristic.

At block 212, the computer measures a first plurality of actual volumes of a sixth plurality of subscribers placing wireless voice calls transmitted by the first base transceiver station during a second plurality of instances of the first predetermined time period wherein the sixth plurality of subscribers exhibit the first demographic characteristic and wherein the second plurality of instances of the first predetermined time period take place over a period of one of weeks, months, and years.

At block 214, the computer measures a second plurality of actual volumes of a seventh plurality of subscribers placing wireless voice calls transmitted by the first base transceiver station during a plurality of instances of the second predetermined time period wherein the seventh plurality of subscribers exhibit the first demographic characteristic and wherein the second plurality of instances of the second predetermined time period take place over a period of one of weeks, months, and years.

At block 216, the computer publishes a third price for advertising content displayed in at least one of viewable and audible media proximate the first base transceiver station during future instances of the first predetermined time period wherein the third price is based on the first plurality of actual volumes being observed as greater than the first projected volume and wherein the third price is higher than the first price.

At block 218, the computer publishes a fourth price for advertising content displayed in at least one of viewable and audible media proximate the first base transceiver station during future instances of the second predetermined time period wherein the fourth price is based on the second plurality of actual volumes being observed as less than the second projected volume and wherein the fourth price is less than the second price.

Figure 3:
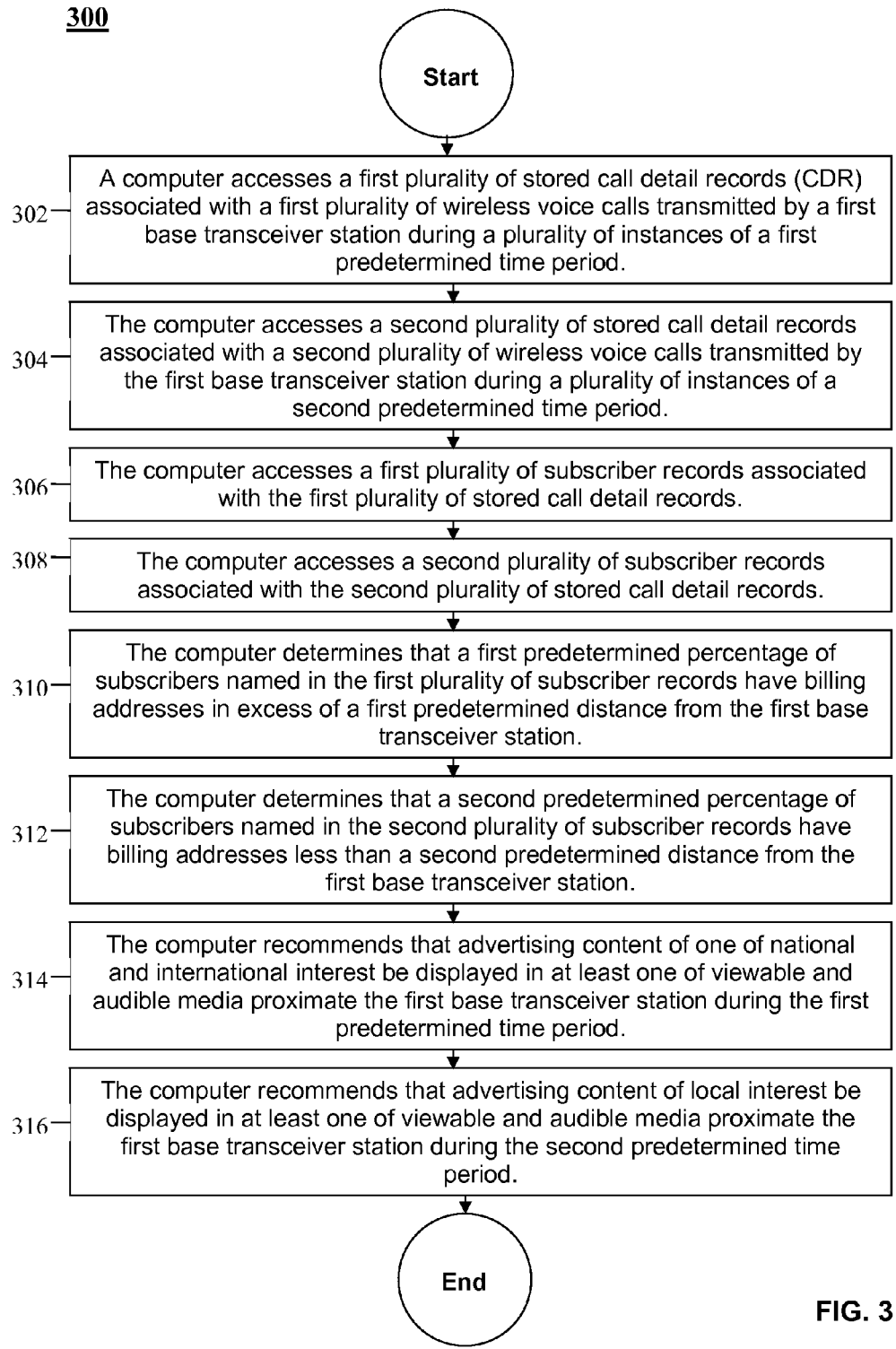
FIG. 3 is a flow chart illustrating a method according to an embodiment of the disclosure.

Turning now to FIG. 3, a processor-implemented method 300 is described. Beginning at block 302, a computer accesses a first plurality of stored call detail records (CDR) associated with a first plurality of wireless voice calls transmitted by a first base transceiver station during a plurality of instances of a first predetermined time period.

At block 304, the computer accesses a second plurality of stored call detail records associated with a second plurality of wireless voice calls transmitted by the first base transceiver station during a plurality of instances of a second predetermined time period.

At block 306, the computer accesses a first plurality of subscriber records associated with the first plurality of stored call detail records. At block 308, the computer accesses a second plurality of subscriber records associated with the second plurality of stored call detail records.

At block 310, the computer determines that a first predetermined percentage of subscribers named in the first plurality of subscriber records have billing addresses in excess of a first predetermined distance from the first base transceiver station. At block 312, the computer determines that a second predetermined percentage of subscribers named in the second plurality of subscriber records have billing addresses less than a second predetermined distance from the first base transceiver station.

At block 314, the computer recommends that advertising content of one of national and international interest be displayed in at least one of viewable and audible media proximate the first base transceiver station during the first predetermined time period. At block 316, the computer recommends that advertising content of local interest be displayed in at least one of viewable and audible media proximate the first base transceiver station during the second predetermined time period.

Figure 4:
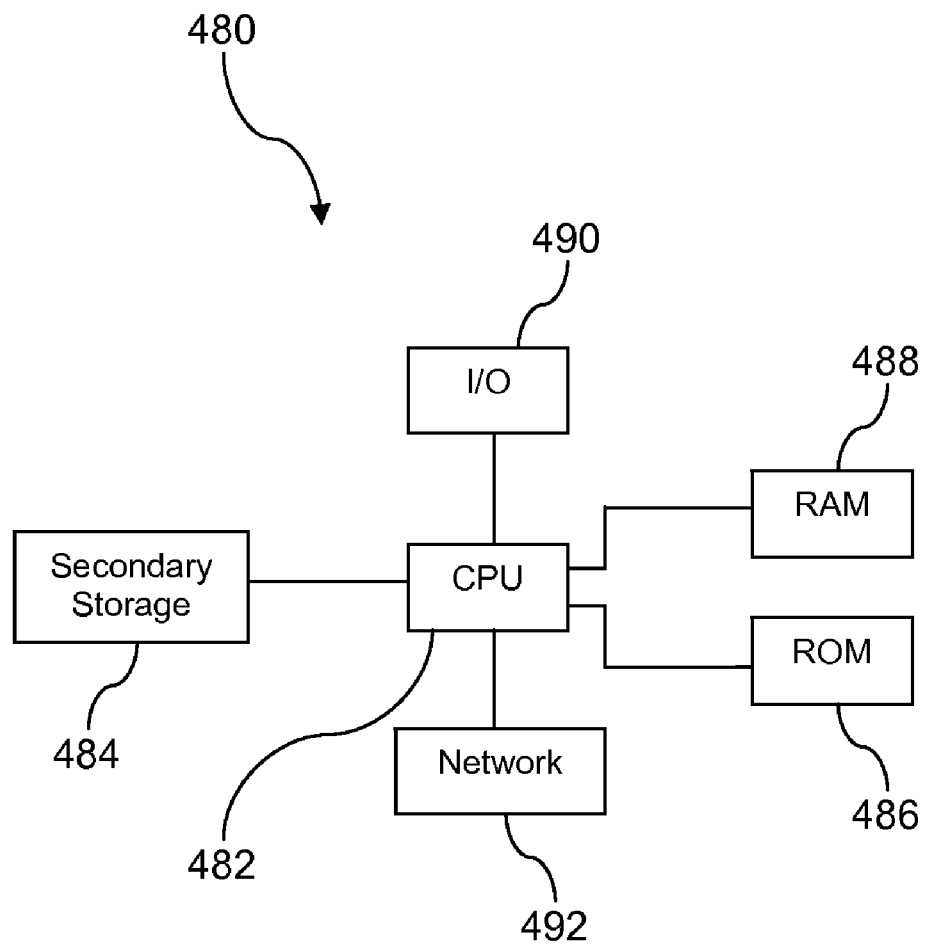
FIG. 4 illustrates an exemplary computer system suitable for implementing some aspects of the several embodiments of the disclosure.

FIG. 4 illustrates a computer system 480 suitable for implementing one or more embodiments disclosed herein. The computer system 480 includes a processor 482 (which may be referred to as a central processor unit or CPU) that is in communication with memory devices including secondary storage 484, read only memory (ROM) 486, random access memory (RAM) 488, input/output (I/O) devices 490, and network connectivity devices 492. The processor 482 may be implemented as one or more CPU chips.

It is understood that by programming and/or loading executable instructions onto the computer system 480, at least one of the CPU 482, the RAM 488, and the ROM 486 are changed, transforming the computer system 480 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 484 is typically comprised of one or more disk drives or tape drives and is used for non-volatile storage of data and as an over-flow data storage device if RAM 488 is not large enough to hold all working data. Secondary storage 484 may be used to store programs which are loaded into RAM 488 when such programs are selected for execution. The ROM 486 is used to store instructions and perhaps data which are read during program execution. ROM 486 is a non-volatile memory device which typically has a small memory capacity relative to the larger memory capacity of secondary storage 484. The RAM 488 is used to store volatile data and perhaps to store instructions. Access to both ROM 486 and RAM 488 is typically faster than to secondary storage 484. The secondary storage 484, the RAM 488, and/or the ROM 486 may be referred to in some contexts as computer readable storage media and/or non-transitory computer readable media.

I/O devices 490 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 492 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 492 may enable the processor 482 to communicate with the Internet or one or more intranets. With such a network connection, it is contemplated that the processor 482 might receive information from the network, or might output information to the network in the course of performing the above-described method steps. Such information, which is often represented as a sequence of instructions to be executed using processor 482, may be received from and outputted to the network, for example, in the form of a computer data signal embodied in a carrier wave.

Such information, which may include data or instructions to be executed using processor 482 for example, may be received from and outputted to the network, for example, in the form of a computer data baseband signal or signal embodied in a carrier wave. The baseband signal or signal embodied in the carrier wave generated by the network connectivity devices 492 may propagate in or on the surface of electrical conductors, in coaxial cables, in waveguides, in an optical conduit, for example an optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 482 executes instructions, codes, computer programs, scripts which it accesses from hard disk, floppy disk, optical disk (these various disk based systems may all be considered secondary storage 484), ROM 486, RAM 488, or the network connectivity devices 492. While only one processor 482 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 484, for example, hard drives, floppy disks, optical disks, and/or other device, the ROM 486, and/or the RAM 488 may be referred to in some contexts as non-transitory instructions and/or non-transitory information.

In an embodiment, the computer system 480 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 480 to provide the functionality of a number of servers that is not directly bound to the number of computers in the computer system 480. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 480, at least portions of the contents of the computer program product to the secondary storage 484, to the ROM 486, to the RAM 488, and/or to other non-volatile memory and volatile memory of the computer system 480. The processor 482 may process the executable instructions and/or data structures in part by directly accessing the computer program product, for example by reading from a CD-ROM disk inserted into a disk drive peripheral of the computer system 480. Alternatively, the processor 482 may process the executable instructions and/or data structures by remotely accessing the computer program product, for example by downloading the executable instructions and/or data structures from a remote server through the network connectivity devices 492. The computer program product may comprise instructions that promote the loading and/or copying of data, data structures, files, and/or executable instructions to the secondary storage 484, to the ROM 486, to the RAM 488, and/or to other non-volatile memory and volatile memory of the computer system 480.

In some contexts, a baseband signal and/or a signal embodied in a carrier wave may be referred to as a transitory signal. In some contexts, the secondary storage 484, the ROM 486, and the RAM 488 may be referred to as a non-transitory computer readable medium or a computer readable storage media. A dynamic RAM embodiment of the RAM 488, likewise, may be referred to as a non-transitory computer readable medium in that while the dynamic RAM receives electrical power and is operated in accordance with its design, for example during a period of time during which the computer system 480 is turned on and operational, the dynamic RAM stores information that is written to it. Similarly, the processor 482 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system for analyzing call detail records to derive demographic data, comprising:
   a processor;
   a memory; and
   an application stored in the memory, that, when executed by the processor:
      accesses a first plurality of stored call detail records (CDR),
      selects a first plurality of call detail records from a data store associated with voice calls transmitted via a base transceiver station,
      selects a second plurality of call detail records from the first plurality of call detail records wherein the second plurality of call detail records were created during a predetermined time period,
      accesses subscriber records associated with the second plurality of call detail records,
      determines from demographic information in the subscriber records that a predetermined percentage of subscribers associated with the subscriber records exhibit a demographic characteristic,
      compiles statistical information linking subscribers associated with the demographic characteristic to potential benefit associated with access to traffic of the subscribers in a coverage area of the base transceiver station, and
      propagates the statistical information on at least one of a commercial, academic, and public basis.

2. The system of claim 1, wherein the predetermined time period is one of about one hour, about three hours, and about five hours in duration.

3. The system of claim 1, wherein the voice calls transmitted by the base transceiver station are associated with portable electronic devices.

4. The system of claim 1, wherein the portable electronic devices are carried by the subscribers and the subscribers enter the coverage area of the base transceiver station in one of a vehicle, on foot, and using another means.

5. The system of claim 1, wherein the demographic characteristic is one of gender of subscriber, age of subscriber, and income level of subscriber.

6. The system of claim 1, wherein the potential benefit associated with access to traffic of the subscribers comprises at least one of return on investment arising from advertising on at least one of a billboard and other media in the vicinity of the base transceiver station and return on investment arising from establishing a commercial investment in the vicinity of the base transceiver station.

7. The system of claim 1, wherein publishing the statistical information on a commercial basis is associated with setting pricing for placement of advertising content on at least one of a billboard and other media in the vicinity of the base transceiver station.

8. The system of claim 1, wherein the predetermined percentage of subscribers exhibiting the demographic characteristic indicates types of content to display in visual and audible messages during the predetermined time period.

\* \* \* \* \*